US010880950B2

(12) United States Patent
Ye et al.

(10) Patent No.: US 10,880,950 B2
(45) Date of Patent: Dec. 29, 2020

(54) FLEXIBLE RESOURCE ALLOCATION FOR EVEN FURTHER ENHANCED MACHINE TYPE COMMUNICATION (EFEMTC)

(71) Applicant: Intel Corporation, Santa Clara, CA (US)

(72) Inventors: Qiaoyang Ye, Fremont, CA (US); Debdeep Chatterjee, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/277,556

(22) Filed: Feb. 15, 2019

(65) Prior Publication Data

US 2019/0182899 A1 Jun. 13, 2019

Related U.S. Application Data

(60) Provisional application No. 62/710,499, filed on Feb. 16, 2018.

(51) Int. Cl.
| | |
|---|---|
| *H04W 88/06* | (2009.01) |
| *H04W 4/70* | (2018.01) |
| *H04W 8/22* | (2009.01) |
| *H04W 72/04* | (2009.01) |
| *H04W 48/12* | (2009.01) |

(Continued)

(52) U.S. Cl.
CPC ............... *H04W 88/06* (2013.01); *H04L 5/00* (2013.01); *H04L 5/0044* (2013.01); *H04L 5/0053* (2013.01); *H04L 5/0094* (2013.01); *H04W 4/70* (2018.02); *H04W 4/80* (2018.02); *H04W 8/22* (2013.01); *H04W 72/042* (2013.01);

(Continued)

(58) Field of Classification Search
CPC ....... H04W 88/06; H04W 76/27; H04W 4/80; H04W 72/042; H04W 8/22; H04W 4/70; H04W 48/12; H04L 5/00; H04L 5/0044; H04L 5/0053; H04L 5/0094; H04L 5/0012
See application file for complete search history.

(56) References Cited

U.S. PATENT DOCUMENTS

| | | | |
|---|---|---|---|
| 2015/0245343 A1* | 8/2015 | Wang ................ | H04W 72/0413 370/280 |
| 2016/0088593 A1* | 3/2016 | Davydov ............ | H04W 72/042 370/329 |

(Continued)

*Primary Examiner* — Christopher P Grey
(74) *Attorney, Agent, or Firm* — Schwegman Lundberg & Woessner, P.A.

(57) ABSTRACT

A User Equipment (UE) includes processing circuitry coupled to memory. To configure the UE for machine type communication (MTC), the processing circuitry is to decode radio resource control (RRC) signaling from a base station (such as an Evolved Node-B (eNB)). The RRC signaling indicates activation of flexible starting physical resource block (PRB) for physical downlink shared channel (PDSCH) resource allocation. DCI received on an MTC physical downlink control channel (MPDCCH) is decoded, the DCI indicating a narrowband (NB) index of a NB frequency resource and at least one PRB index for the PDSCH resource allocation. The NB frequency resource indicated by the NB index is shifted based on the activation of the flexible starting PRB for PDSCH resource allocation. PDSCH data received from the base station using the shifted NB frequency resource is decoded.

20 Claims, 7 Drawing Sheets

(51) Int. Cl.
  *H04W 4/80* (2018.01)
  *H04W 76/27* (2018.01)
  *H04L 5/00* (2006.01)

(52) U.S. Cl.
  CPC ........... *H04W 76/27* (2018.02); *H04L 5/0012* (2013.01); *H04W 48/12* (2013.01)

(56) References Cited

U.S. PATENT DOCUMENTS

2018/0242321 A1* 8/2018 Takeda .................. H04L 5/0051
2018/0295651 A1* 10/2018 Cao ..................... H04W 72/042
2019/0253100 A1* 8/2019 Liu ........................ H04B 1/713
2020/0084768 A1* 3/2020 Liu ........................ H04B 1/713

* cited by examiner

FLEXIBLE RESOURCE ALLOCATION FOR EVEN FURTHER ENHANCED MACHINE TYPE COMMUNICATION (EFEMTC)

PRIORITY CLAIM

This application claims the benefit of priority to the U.S. Provisional Patent Application Ser. No. 62/710,499, filed Feb. 16, 2018, and entitled "DESIGN OF FLEXIBLE RESOURCE ALLOCATION FOR RELEASE 15 (REL-15) EVEN FURTHER ENHANCED MACHINE TYPE COMMUNICATION (EFEMTC)," which patent application is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for flexible resource allocation for machine type communication (MTC) in an LTE network, such as even further enhanced MTC (efeMTC).

BACKGROUND

Mobile communications have evolved significantly from early voice systems to today's highly sophisticated integrated communication platform. With the increase in different types of devices communicating with various network devices, the usage of 3GPP LTE systems has increased. The penetration of mobile devices (user equipment or UEs) in modern society has continued to drive demand for a wide variety of networked devices in a number of disparate environments. Fifth generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques to address flexible resource allocation for MTC in an LTE network, such as efeMTC.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1A:
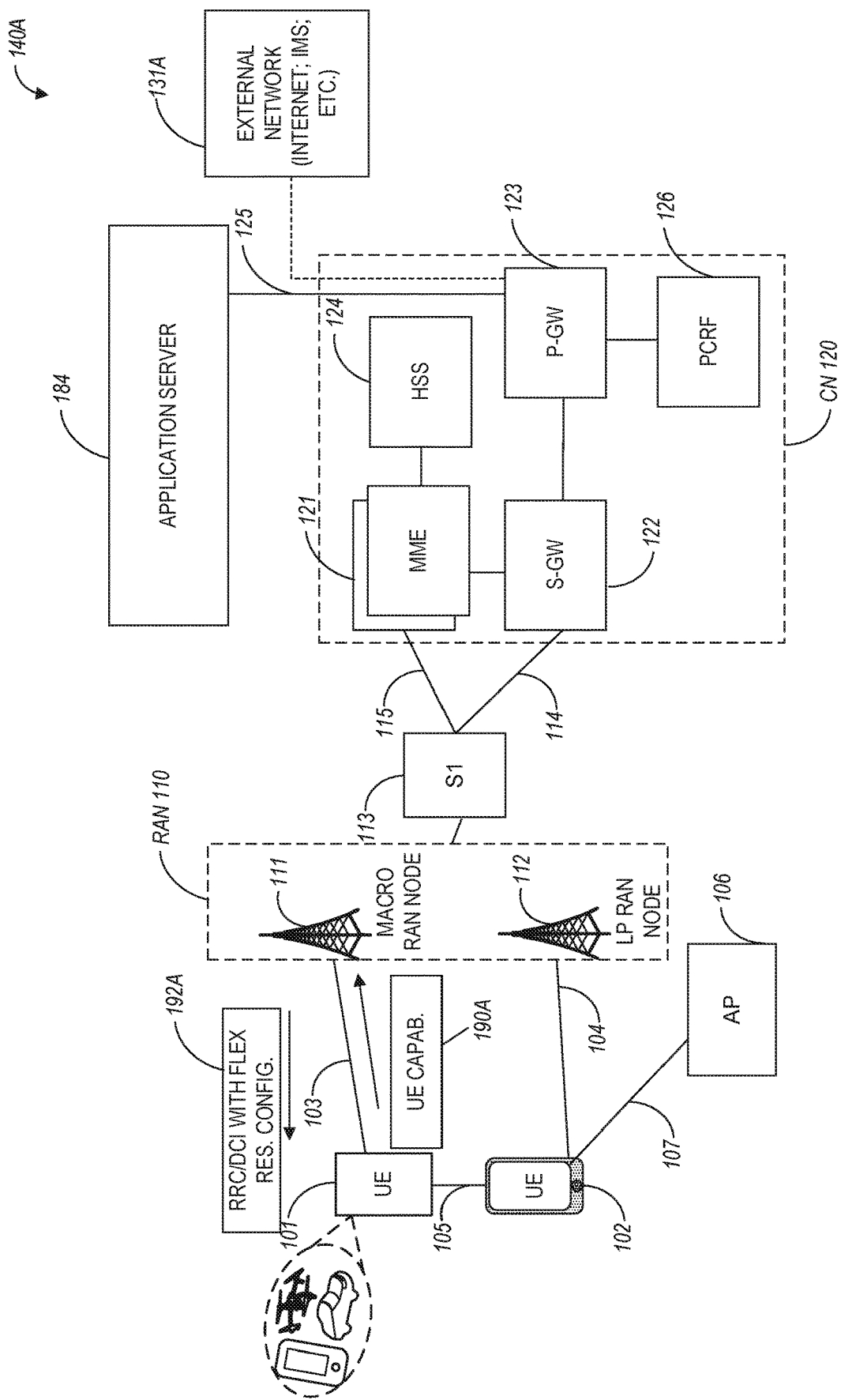
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed- Assisted Access (LAA), which expands the system bandwidth by utilizing the flexible carrier aggregation (CA) framework introduced by the LTE-Advanced system. Rel-13 LAA system focuses on the design of downlink operation on the unlicensed spectrum via CA, while Rel-14 enhanced LAA (eLAA) system focuses on the design of uplink operation on the unlicensed spectrum via CA.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) wherein particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive or transmit data.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some aspects, the network 140A can include a core network (CN) 120. Various aspects of NG RAN and NG Core are discussed herein in reference to, e.g., FIG. 1B, FIG. 1C, and FIG. 1D.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe for sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe the mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PUSCH) as well as for sounding reference signal (SRS) transmission.

In some aspects, the communication network 140A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel); and (c) guard-band deployment (the network operates in the guard band of legacy LTE channels). In some aspects, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macrocells, and, consequently, the DL coverage can be affected and/or reduced. In addition, some NB-IoT UEs can be configured to transmit at maximum power if repetitions are used for UL transmission. This may result in large inter-cell interference in dense small cell deployments.

In some aspects, the UE 101 can support connectivity to a 5G core network (5GCN) and can be configured to operate with Early Data Transmission (EDT) in a communication architecture that supports one or more of Machine Type Communications (MTC), enhanced MTC (eMTC), further enhanced MTC (feMTC), even further enhanced MTC (efeMTC), and narrowband Internet-of-Things (NB-IoT) communications. When operating with EDT, a physical random access channel (PRACH) procedure message 3 (MSG3) can be used to carry the short uplink (UL) data and PRACH procedure message 4 (MSG4) can be used to carry short downlink (DL) data (if any is available). When a UE wants to make a new RRC connection, it first transmits one or more preambles, which can be referred to as PRACH procedure message 1 (MSG1). The MSG4 can also indicate UE to immediately go to IDLE mode. For this purpose, the transport block size (TBS) scheduled by the UL grant received for the MSG3 to transmit UL data for EDT needs to be larger than the TBS scheduled by the legacy grant. In some aspects, the UE can indicate its intention of using the early data transmission via MSG1 using a separate PRACH resource partition. From MSG1, eNB knows that it has to provide a grant scheduling TBS values that may differ from legacy TBS for MSG3 in the random-access response (RAR or MSG2) so that the UE can transmit UL data in MSG3 for EDT. However, the eNB may not exactly know what would be the size of UL data the UE wants to transmit for EDT and how large a UL grant for MSG3 would be needed, though a minimum and a maximum TBS for the UL grant could be defined. The following two scenarios may occur: (a) The UL grant provided in RAR is larger than the UL data plus header. In this case, layer 1 needs to add one or more padding bits in the remaining grant. However, transmitting a large number of padding bits (or useless bits) is not power efficient especially in deep coverage where a larger number of repetitions of transmission is required. (b) Similarly, when the UL grant provided in RAR is large but falls short to accommodate the UL data for the EDT, the UE may have to send only the legacy RRC message to fallback to legacy RRC connection. In this case, UE may again need to transmit a number of padding bits, which can be inefficient.

As used herein, the term "PRACH procedure" can be used interchangeably with the term "Random Access procedure" or "RA procedure".

In some aspects and as described hereinbelow, the UE 101 (and 102) can be configured for flexible resource allocation. For example, UE 101 can communicate UE capabilities 190A to eNB 111, notifying the eNB that the UE can support flexible resource allocation. In some aspects, eNB 111 can configure the UE 101 for flexible resource allocation using configuration information 192A. For example, configuration information 192A can include a radio resource control (RRC) signaling to indicate activation of flexible starting physical resource block (PRB) for physical downlink shared channel (PDSCH) resource allocation or activation of flexible resource allocation for other types of communication channels. In some aspects, configuration information can further include downlink control information (DCI), which can specify an uplink or downlink resource for use by the UE to send or receive data. For example, the DCI can specify an NB index and a physical resource block (PRB) index or indices of PRBs within the specified NB. UE 101 may then shift the NB resource associated with the NB index based on the indicated activation of flexible resource allocation. The shifting of the resource can be performed based on predefined indication so that a boundary of the shifted NB resource aligns with a resource block group (RBG) boundary, as explained hereinbelow.

Figure 1B:
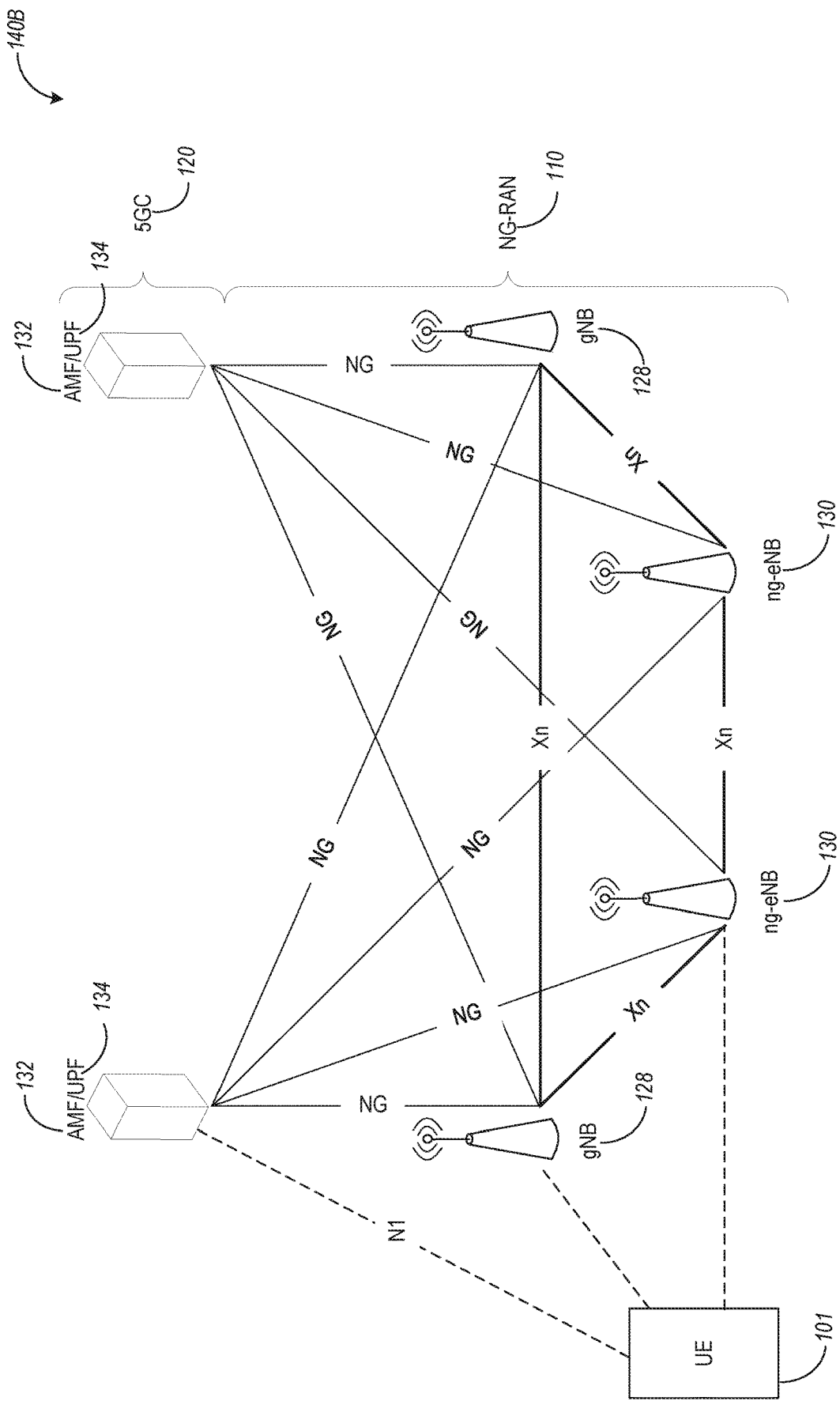
FIG. 1B is a simplified diagram of an overall next generation (NG) system architecture, in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130.

The core network 120 (e.g., a 5G core network or 5GC) can include an access and mobility function (AMF) 132 and/or a user plane function (UPF) 134. The AMF 132 and the UPF 134 can be communicatively coupled to the gNBs 128 and the NG-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some aspects, a gNB 128 can include a node providing new radio (NR) user plane and control plane protocol termination towards the UE and is connected via the NG interface to the 5GC 120. In some aspects, an NG-eNB 130 can include a node providing evolved universal terrestrial radio access (E-UTRA) user plane and control plane protocol terminations towards the UE and is connected via the NG interface to the 5GC 120.

In some aspects, the NG system architecture 140B can use reference points between various nodes as provided by 3GPP Technical Specification (TS) 23.501 (e.g., V15.4.0, 2018 December).

In some aspects, each of the gNBs 128 and the NG-eNBs 130 can be implemented as a base station, a mobile edge server, a small cell, a home eNB, and so forth.

In some aspects, node 128 can be a master node (MN) and node 130 can be a secondary node (SN) in a 5G architecture. The MN 128 can be connected to the AMF 132 via an NG-C interface and to the SN 128 via an XN-C interface. The MN 128 can be connected to the UPF 134 via an NG-U interface and to the SN 128 via an XN-U interface.

Figure 1C:
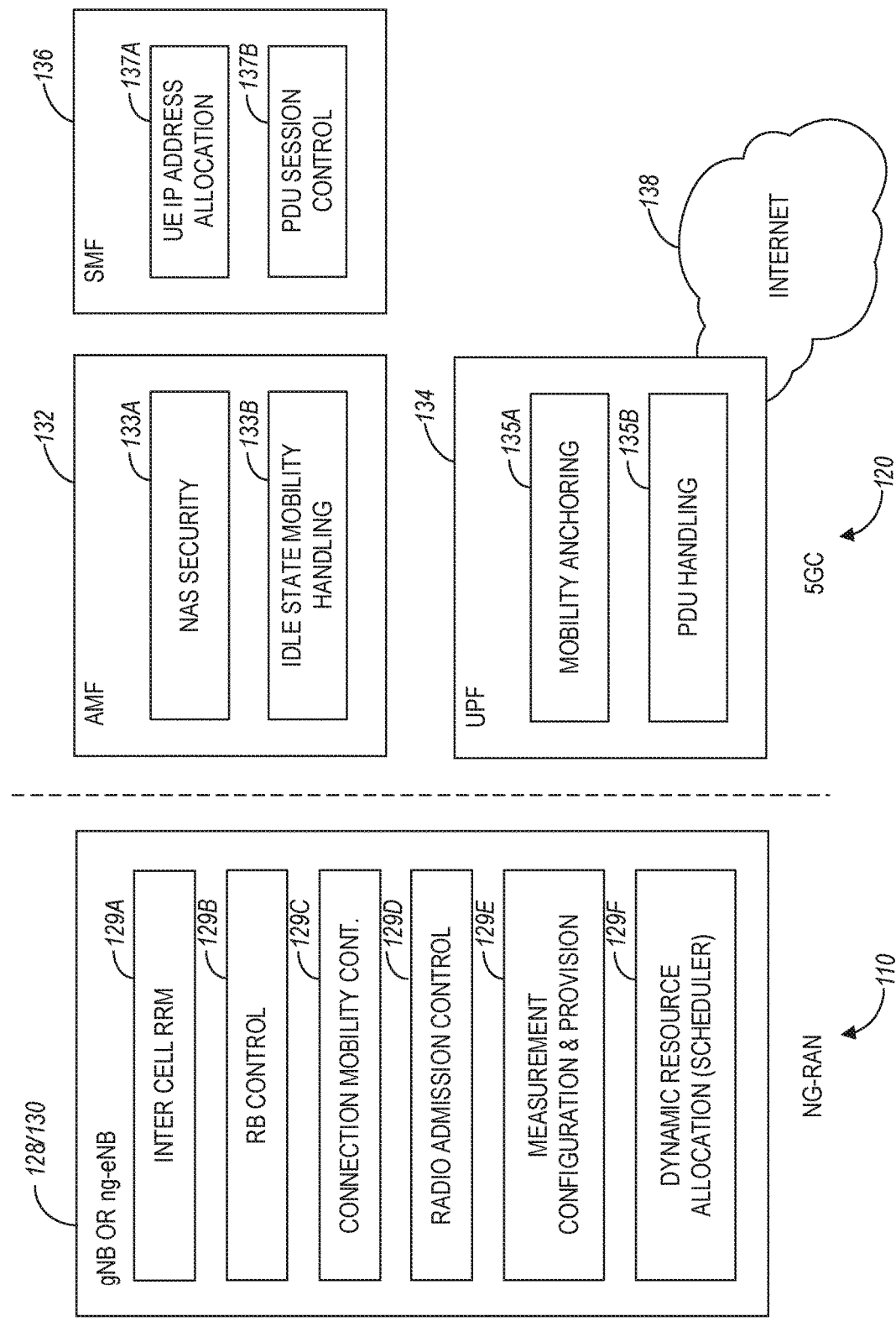
FIG. 1C illustrates a functional split between next generation radio access network (NG-RAN) and the 5G Core network (5GC), in accordance with some aspects.

FIG. 1C illustrates a functional split between NG-RAN and the 5G Core (5GC) in accordance with some aspects. Referring to FIG. 1C, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 132 can be configured to host the following functions, for example: NAS signaling termination; NAS signaling security 133A; access stratum (AS) security control; inter-core network (CN) node signaling for mobility between 3GPP access networks; idle state/mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); and/or downlink packet buffering and downlink data notification triggering, among other functions.

The Session Management function (SMF) 136 can be configured to host the following functions, for example: session management; UE IP address allocation and management 137A; selection and control of user plane function (UPF); PDU session control 137B, including configuring traffic steering at UPF 134 to route traffic to proper destination; control part of policy enforcement and QoS; and/or downlink data notification, among other functions.

Figure 1D:
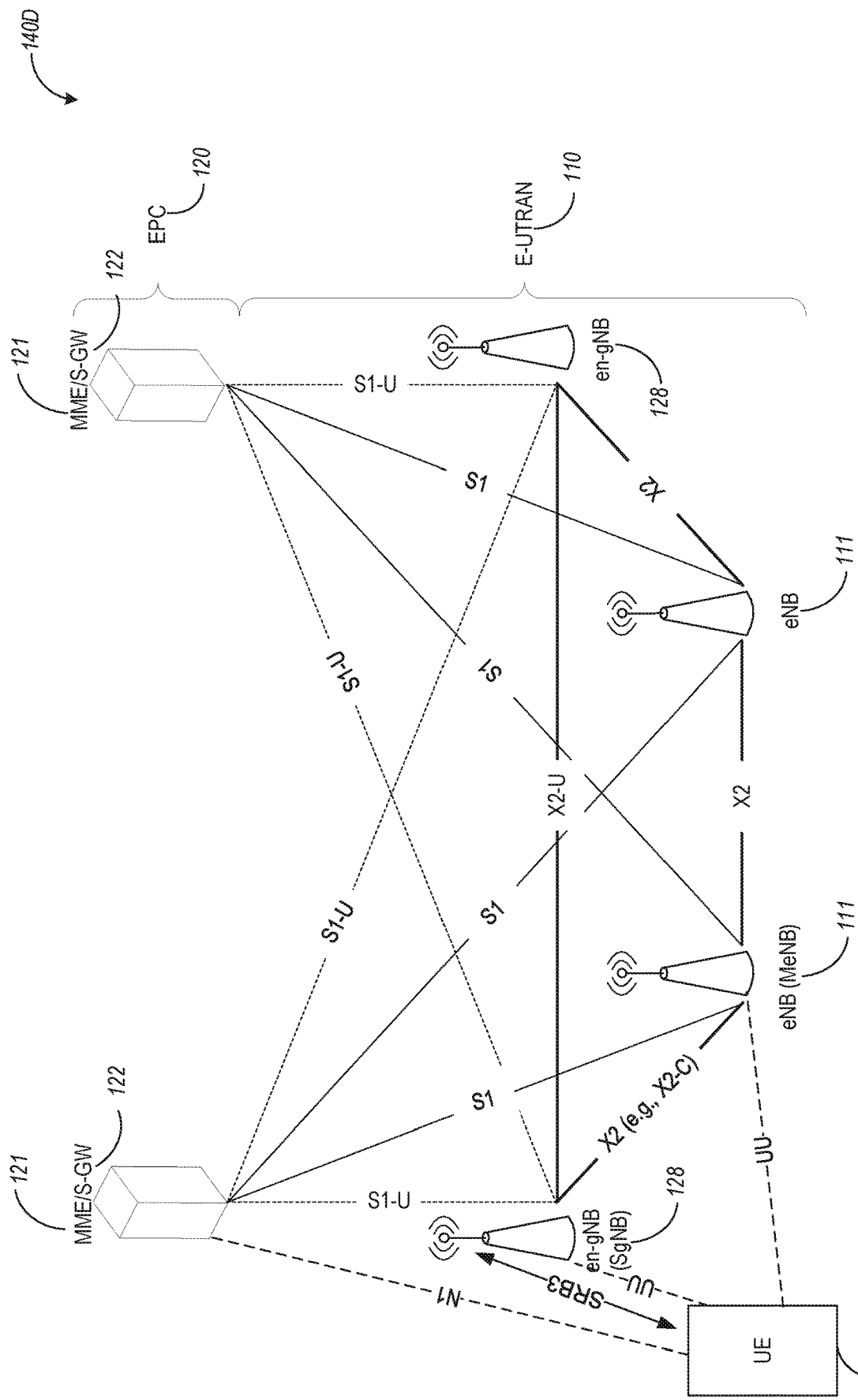
FIG. 1D illustrates an example Evolved Universal Terrestrial Radio Access (E-UTRA) New Radio Dual Connectivity (EN-DC) architecture, in accordance with some aspects.

FIG. 1D illustrates an example Evolved Universal Terrestrial Radio Access (E-UTRA) New Radio Dual Connectivity (EN-DC) architecture, in accordance with some aspects. Referring to FIG. 1D, the EN-DC architecture 140D includes radio access network (or E-TRA network, or E-TRAN) 110 and EPC 120. The EPC 120 can include MMEs 121 and S-GWs 122. The E-UTRAN 110 can include nodes 111 (e.g., eNBs) as well as Evolved Universal Terrestrial Radio Access New Radio (EN) next generation evolved Node-Bs (en-gNBs) 128.

In some aspects, en-gNBs 128 can be configured to provide NR user plane and control plane protocol terminations towards the UE 102 and acting as Secondary Nodes (or SgNBs) in the EN-DC communication architecture 140D. The eNBs 111 can be configured as master nodes (or MeNBs) and the eNBs 128 can be configured as secondary nodes (or SgNBs) in the EN-DC communication architecture 140D. As illustrated in FIG. 1D, the eNBs 111 are connected to the EPC 120 via the S1 interface and to the EN-gNBs 128 via the X2 interface. The EN-gNBs (or SgNBs) 128 may be connected to the EPC 120 via the S1-U interface, and to other EN-gNBs via the X2-U interface. The SgNB 128 can communicate with the UE 102 via a UU interface (e.g., using signaling radio bearer type 3, or SRB3 communications as illustrated in FIG. 1D), and with the MeNB 111 via an X2 interface (e.g., X2-C interface). The MeNB 111 can communicate with the UE 102 via a UU interface.

Even though FIG. 1D is described in connection with EN-DC communication environment, other types of dual connectivity communication architectures (e.g., when the UE 102 is connected to a master node and a secondary node) can also use the techniques disclosed herein.

In some aspects, the MeNB 111 can be connected to the MME 121 via S1-MME interface and to the SgNB 128 via an X2-C interface. In some aspects, the MeNB 111 can be connected to the SGW 122 via S1-U interface and to the SgNB 128 via an X2-U interface. In some aspects associated with dual connectivity (DC) and/or MultiRate-DC (MR-DC), the Master eNB (MeNB) can offload user plane traffic to the Secondary gNB (SgNB) via split bearer or SCG (Secondary Cell Group) split bearer.

Figure 2:
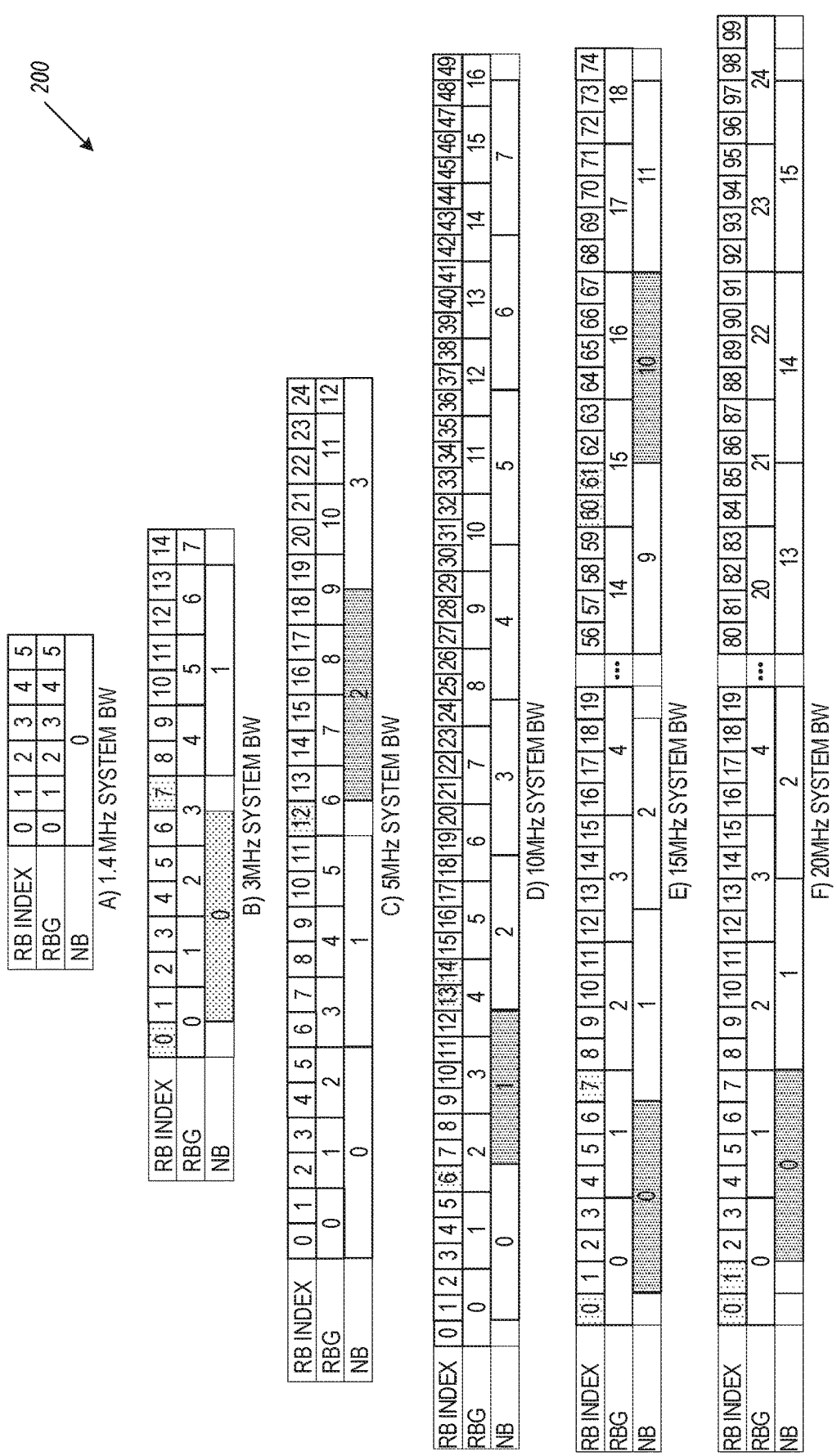
FIG. 2 illustrates example narrowband (NB) and resource block group (RBG) resource allocations, in some aspects.

FIG. 2 illustrates example narrowband (NB) and resource block group (RBG) resource allocations 200, in some aspects. Referring to FIG. 2, the resource allocations 200 include resource allocations for system bandwidth of 1.4 MHz, 3 MHz, 5 MHz, 10 MHz, 15 MHz, and 20 MHz systems. For each of the allocations for corresponding system bandwidths, there is indicated a narrowband identified by a narrowband (NB) index, a physical resource block (PRB) identified by a PRB (or RB) index, and a resource block group (RBG). The NB allocation can be used for MTC UEs, and the RBG allocation can be used by LTE UEs.

In Rel-13 eMTC, the defined NB is not aligned with the LTE RBG. The misalignment may result in inefficient resource utilization. Taking 10 MHz in FIG. 2 as an example, if the entire at NB #1 is allocated to an eMTC UE, then PRBs #6, 13, and 14 cannot be allocated to LTE UEs with RBG-based resource allocation, which would lead to a waste of three PRBs. In this regard, the following resource allocation enhancements can be used based on techniques disclosed herein: introduce support for more flexible starting PRB for PDSCH resource allocation in connected mode at least for UE operating in coverage enhancement (CE) mode A/B configured with 1.4 MHz max PDSCH channel bandwidth, and introduce support for more flexible starting PRB for PUSCH resource allocation in connected mode at least for UE operating in CE mode A/B configured with 1.4 MHz max PDSCH channel bandwidth. In some aspects, techniques disclosed herein can be used to support flexible starting PRB PDSCH/PUSCH resource allocation for Rel-15 efeMTC. Specifically, the configuration method, design of resource allocation indication, support of flexible resource allocation for sub-PRB PUSCH, frequency retuning techniques, and frequency hopping (FH) techniques are discussed hereinbelow.

Configuration of Flexible Resource Allocation

In one aspect, Rel-15 efeMTC UEs can be configured to support flexible resource allocation. Alternatively, it is the UE capability to support this feature. In some aspects, the configuration of flexible resource allocation depends on UE capability, which can be communicated to the eNB using a UE capability information element.

In some aspects, the eNB can configure whether the flexible resource allocation is supported via higher layer signaling, e.g. using system information block (SIB) signaling or dedicated RRC signaling. In one aspect, the configuration of flexible resource allocation for uplink (UL) and downlink (DL) can be separate. Alternatively, the flexible resource allocation for UL and DL can be jointly configured, i.e. either UL and DL both support flexible resource allocation or neither of them support the flexible resource allocation.

As there is no misalignment issue in system BW of 1.4 MHz, in one example, the flexible resource allocation is not supported for system BW of 1.4 MHz.

In some aspects, flexible resource allocation is not applied to resource allocation with a number of PRBs<X, e.g. X can be the size of an RBG. With this aspect, even when the flexible resource allocation is configured, the resource allocation with the number of PRBs<X can still follow Rel-13 eMTC techniques. As a special case of this aspect, the flexible resource allocation is supported only in CE mode A for PUSCH.

Flexible Resource Allocation Indication

In one aspect, N bits can be used to indicate the offset from the resource allocation indicated based on pre-release indication method in units of RBs. For example, N can be 1 or 2, which can be used to indicate two or four values for the offset.

In one example, the offset values can depend on system BW. For example, N can be different for different system BWs:

N=0 can be used for 1.4 MHz system BW.

N=1 can be used for 3 or 5 MHz system BW to indicate offsets of {0, −1} RB or {0, 1} RB. It can be predefined or RRC configured whether the set {0, −1} or {0, 1} is adopted. For a given offset set, a value of zero indicates no shift of the NB resource, a value of −1 can indicate a shift of the NB resource with one RB to the left, and a value of +1 can indicate a shift of the NB resource with one RB to the right.

Alternatively, N=2 can be used for 3 or 5 MHz system BW to indicate offsets of {−1 RB, 0 RB, 1 RB, reserved}.

N=1 can be used for 10 MHz system BW to indicate offsets of {0, −1} RB or {0, 2} RBs. It can be predefined or RRC configured whether the set {0, −1} or {0, 2} is adopted.

Alternatively, N=2 can be used for 10 MHz system BW to indicate offsets of {−1 RB, 0 RB, 2 RBs, reserved}.

N=1 can be used for 15 MHz system BW to indicate offsets of {0, x} RB(s). The x values can depend on which NB is allocated. For example, x=1 or −1 if NB #0, #1, #2, #3, #4, or #5 is allocated, and x=2 or −2 if NB #6, #7, #8, #9, #10 or #11 is allocated.

Alternatively, N=2 can be used for 15 MHz system BW to indicate offsets of {0, x, y} RB(s), where x can be 1 or −1 and y can be 2 or −2, e.g. {0, −1, −2}.

As another example, N=3 can be used for 15 MHz system BW to indicate offsets of {−2 RBs, −1 RB, 0 RB, 1 RB, 2 RBs, reserved, reserved, reserved}.

N=1 can be used for 20 MHz system BW to indicate offsets of {0, −2} or {0, 2} RB(s). It can be predefined or RRC configured whether the set {0, −2} or {0, 2} is adopted.

Alternatively, N=2 can be used for 20 MHz system BW to indicate offsets of {−2 RBs, 0 RB, 2 RBs, reserved}.

In some aspects, the offset values are independent of system BW. For example, N=2 can be used to indicate offset of {0, x, y, z} RBs, where x, y, z can be any integer or be reserved. For example, the N=2 can be used to indicate offsets of {0, −1, −2, reserved}, or {0, −1, −2, 2} or {0, 1, −1, −2}, etc.

In another aspect, N bits can be used to indicate whether the allocated NB should be shifted to align with the previous or next RBG boundary. In one example, N can be 1 to indicate whether the allocated NB should be shifted to align with the RBG boundary or not. It is predefined or RRC configured which RBG the NB should be aligned with, e.g. the RBG right before or after the NB resource. In some aspects, for PDSCH in CE mode B, 1 bit can be introduced in UE-specific RRC signaling to enable the shift of narrowband to align with an RBG. The shift of narrowband depends on the system bandwidth and the allocated narrowband (can be pre-configured in a specification, in a look-up table, or specifically signaled by the core network to the UE). In one example, N can be 2 to indicate whether the allocated NB should be shifted to align with the RBG boundary right before the NB, or the RBG boundary right after the NB, or the NB should not be shifted.

In another aspect, more bits can be used to indicate the start of NB, which can be in terms of RBG index and/or NB index. For example, the indication of starting RBG can be as follows:

(a) For system BW of 1.4 MHz, starting RBG is always 0 and thus no explicit indication is needed;

(b) For system BW of 3 MHz, starting RBG can be 0, 1 or 4. N=2 bits can be used for the indication, e.g. starting RBG is RBG #0, 1, or 4, or NB #0. Comparing to NB index indication, 1 more bit is needed;

(c) For system BW of 5 MHz, starting RBG can be 0, 3, 6, 7, 9, or 10. N=3 bits can be used for the indication, e.g. starting RBG is RBG #0, 3, 6, 7, 9 or 10, or NB #2 or 3. Comparing to NB index indication, 1 more bit is needed;

(d) For system BW of 10 MHz, starting RBG can be 0, 1, 2, 3, . . . , or 15, and thus N=4 bits can be used for the indication, e.g. starting RBG is RBG #0, 1, 2, 3, . . . , or 15. Comparing to NB index indication, 1 more bit is needed. Alternatively, N=4 bits can be used to indicate starting RBG of #0, 2, 4, . . . , 14 or NB #0, 1, . . . , 7.

(e) For system BW of 15 MHz, starting RBG can be 0, 1, . . . , or 17, and N=5 bits can be used for the indication, e.g. starting RBG is RBG #0, 1, 2, . . . , 17, or NB #0, 1, . . . , 6, 8, or 10. Comparing to NB index indication, 1 more bit is needed.

(f) For system BW of 20 MHz, starting RBG can be 0, 1, 2 . . . , 23, and N=5 bits can be used for the indication, e.g. starting RBG is RBG #0, 1, 2, . . . , 23, or NB #0, 2, 4, 6, . . . , or 14. Comparing to NB index indication, 1 more bit is needed.

In some aspects and in connection with the above techniques, the starting RBG or shift of NB can only change the start of the allocated NB. The RB allocation within the NB can still follow Rel-13 or Rel-14 eMTC RB allocation. In other words, the flexible resource allocation effectively changes the definition of NB in pre-release eMTC, where the new allocable NB can be aligned with the RBG boundary and may be overlapped. The above aspects can be used for PDSCH/PUSCH configured with max BW of 5 MHz as well.

In some aspects, there may be $2^{\left\lceil \log_2 \lfloor N_{UL}^{RB}/6 \rfloor \right\rceil} \times 11$ ($N_{UL}^{RB}$ being the total number of uplink PRBs) unused states (e.g., in a resource allocation field within DCI) for PDSCH/PUSCH with configured max PDSCH/PUSCH BW of 1.4 MHz in CE mode A. These unused states can be used for flexible resource allocation indication. For example, the NB can be indicated the same as in Rel-13 eMTC. Once the NB index is indicated in the DCI, there may be up to 11 unused states, which can be used to indicate RBG boundary aligned resource allocation (e.g., whether or not to shift the indicated NB and by how many PRBs). An example of this aspect is provided as follows, where the flexible resource allocation is supported only when the allocated number of PRBs is no less than the RBG size. Other examples are not precluded.

(a) For a system BW of 3 MHz, the 11 states can be used to indicate allocation of {RBG n, RBG n+1, RGB n+2, 3 PRBs starting from RBG n, n+1 or n+2, RBGs n and n+1, RBGs n+1 and n+2, 5 PRBs starting from RBG n, n+1, and 6 PRBs starting from RBG n}, where n=0 when NB #0 is indicated and n=4 when NB #1 is indicated. Similar allocation can be used for 5 MHz system BW, where n=0, 6, 12 and 18 when NB #0, 1, 2, and 3 are indicated, respectively.

(b) For a system BW of 10 MHz where RBG size is 3, the 11 states can be used to indicate allocation of {RBG n, RBG n+1, RBG n+2, 4 PRBs starting from RBG n or n+1, 5 PRBs starting from RBG n, 6 PRBs starting from RBG n}, where n can be the RBG index that right before the boundary of the indicated NB.

(c) For a system BW of 15 and 20 MHz where RBG size is 4, the 11 states can be used to indicate allocation of {RBG n, RBG n+1, 5 PRBs starting from RBG n, 6 PRBs starting from RBG n}, where n can be the RBG index that right before the boundary of the indicated NB.

In another aspect, when the flexible resource allocation is supported for allocation with number of PRB>=X, the resource allocation states for a number of allocated PRBs>=X can be reinterpreted for flexible resource allocation. For example, the resource allocation with a number of PRBs>=X is shifted to the RBG boundary right before or after the starting PRB when flexible resource allocation is configured. No additional bits are needed for this example.

Alternatively, once flexible resource allocation is configured, only resource allocation with a number of PRBs>=X is supported. The resource allocation field can be used to indicate the number of allocation PRBs and offset jointly. For example, the NB can still be indicated as in Rel-13 eMTC. In CE mode A, there are 5 bits to indicate PRB allocation. In one example, Y out of 5 bits can be used to indicate the offsets, while remaining (5-Y) bits can be used for PRB allocation indication. For example, Y can be 1, where 1 bit to indicate whether the allocation should be aligned with RBG boundary or to indicate the offset as elaborated above (i.e., the above cases with N=1). In this example, the remaining 4 bits can be used to indicate possible PRB allocation, e.g. the allocations from the set {2 PRBs starting from RB #0, 1, 2, 3, 4; 3 PRBs starting from RB #0, 1, 2, 3; 4 PRBs starting from RB #0, 1, 2; 5 PRBs starting from RB #0, 1; 6 PRBs starting from RB #0}, where the RBs are the RBs within the indicated NB. This example can be applied to both PDSCH in CE mode A configured with 1.4 MHz or 5 MHz max PDSCH BW, and PUSCH in CE mode A configured with 1.4 MHz max PUSCH BW. For PUSCH in CE mode A configured with 5 MHz max BW, additional bits can be added to indicate the offsets as discussed in the above aspects. On the other hand, for PDSCH in CE mode B, additional bits can be added to indicate the offsets, where the 1 bit for PRB allocation indication when 1.4 MHz max PDSCH BW is configured can follow Rel-13 eMTC. For PUSCH in CE mode B, the possible allocations are either 1 or 2 PRBs, indicated by 2 bits in Rel-13 eMTC. In one example, when flexible resource allocation is configured, 1 bit can be used to indicate the offset, while the remaining bit can be used to indicate one out of two possible allocations (e.g. starting or ending 2 PRBs). This can be applied for system BW of 3 and 5 MHz, where RBG size is 2.

For the additional bits needed for the flexible resource allocation, in one aspect, the DCI size can be extended or certain fields may be reinterpreted, when flexible resource allocation for PDSCH/PUSCH is configured via higher layer signaling. As a specific example of the second option, for aspects where the flexible resource allocation is not supported for frequency hopping (FH), the FH flag bit can be used together with resource allocation field for the flexible resource allocation indication.

Support of Flexible Resource Allocation for Sub-PRB PUSCH

In one aspect, the flexible resource allocation is not supported for sub-PRB PUSCH. One example of this aspect is that the flexible resource allocation and the sub-PRB PUSCH cannot be configured together. In this case, if N additional bits are added for sub-PRB PUSCH allocation, these N bits can be reused for flexible resource allocation indication when flexible resource allocation is configured. Another example of this aspect is that the flexible resource allocation and sub-PRB PUSCH can be configured simultaneously. However, when sub-PRB PUSCH is scheduled, the DCI indication related to flexible resource allocation would be ignored.

Alternatively, the flexible resource allocation is supported for sub-PRB PUSCH. When both sub-PRB and flexible resource allocation are supported, the following techniques can be considered for the resource allocation of sub-PRB PUSCH:

(a) In one aspect, the resource allocation for sub-PRB PUSCH can be in terms of NB index indication, PRB indication within the NB and subcarrier allocation within the PRB. The indication of NB index can be updated as the embodiments elaborated in the above section "Flexible resource allocation indication".

(b) In another aspect, the resource allocation of sub-PRB PUSCH can be in terms of RBG index, PRB indication within the RBG, and subcarrier allocation within the PRB. The RBG index can be indicated by $$\left\lceil \log_2 \left\lfloor \frac{N_{RB}^{UL}}{N_{RBG}} \right\rfloor \right\rceil,$$

where $N_{RB}^{UL}$ is the number of PRBs in the UL, and $N_{RBG}$ is the number of PRBs in the RBG. A default PRB within the RBG such as the first PRB or the last PRB within the RBG (which can be predefined or RRC configured) can be allocated for the sub-PRB PUSCH.

Frequency Retuning

In some aspects, the frequency retuning can occur when the PDSCH/PUSCH switches from one NB to another NB, where the NB can be different from the NB definition in Rel-13 or Rel-14 eMTC. The NB can be the shifted NB if the resource allocation indicates that the NB is shifted to align with the RBG boundary. Further, in case flexible resource allocation for PDSCH indicates PDCCH reception on a set of resources that requires the UE to perform frequency retuning from the NB in which the MPDCCH was received, the UE is not expected to monitor MPDCCH until after the reception of the scheduled PDSCH, when the UE retunes back to the NB configured to monitor PDCCH in the corresponding DL subframe. If a BL/CE UE configured with flexible starting PRB and the PUSCH allocated resources are not fully within one narrowband, in case of CE Mode A, the tuning narrowband is defined as consecutive 6 PRBs starting from RBstart (e.g., the RB at the start of the shifted NB) with the center frequency set in the middle; and in case of CE Mode B, the tuning narrowband is defined as consecutive 6 PRBs with the center frequency set in the middle of allocated two PRBs.

In aspects where the NB index allocated for the DL/UL is the same, but one is shifted to align with RBG boundary while the other is the NB defined in pre-release without offsets, the UE can still perform RF retuning when it switches between these two NBs, if UE max PDSCH/PUSCH BW is 1.4 MHz. Alternatively, if the offset of these two NB is no larger than 1 PRB, UE can avoid the frequency retuning.

In aspects where the NB indices allocated for the DL/UL are different, frequency retuning rule follows pre-release eMTC. When frequency retuning occurs, the retuning between DL or UL to DL can use the legacy PDCCH region. The puncturing rules for PUSCH/PUCCH in UL retuning cases follows Rel-13 eMTC as follows:

(a) Case 1 (PUSCH'PUSCH): Last symbol of the earlier subframe+first symbol of the latter subframe;

(b) Case 2 (PUCCH 'PUCCH): Last symbol of the earlier subframe+first symbol of the latter subframe;

(c) Case 3 (PUCCH 'PUSCH): First two symbols of the latter subframe;

(d) Case 4 (PUSCH 'PUCCH): Last two symbols of the earlier subframe; and (e) Case 5 (PRACH'PRACH): Up to UE implementation.

Frequency Hopping (FH) Scheme

In one aspect, the FH and flexible resource allocation cannot be supported simultaneously. For example, once the flexible resource allocation is configured, FH will not be configured, and the FH flag bit in DCI can be used for another purpose (e.g. flexible resource allocation indication).

In another aspect, the FH and flexible resource allocation can be supported together. For a BL/CE UE configured with flexible starting PDSCH PRB and max 1.4 MHz PDSCH channel bandwidth, PDSCH frequency hopping is supported. For a BL/CE UE configured with flexible starting PUSCH PRB and max 1.4 MHz PUSCH channel bandwidth, PUSCH frequency hopping is supported. When flexible resource allocation indicates NB that is shifted to align with the RBG boundary, the following FH scheme can be considered:

(a) The NB can be shifted back to align with the NB defined in Rel-13 eMTC. The FH scheme follows pre-release eMTC FH scheme. After applying the FH, the new NB that the UE hopped to is the one allocated for the PDSCH/PUSCH;

(b) The NB can be shifted back to align with the NB defined in Rel-13 eMTC. The FH scheme follows pre-release eMTC FH scheme. After applying the FH, a new NB can be obtained. The same offset applied to previous NB can be applied to the new NB. Alternatively, a different offset can be applied to the hopped NB, which can be indicated via DCI or RRC signaling. In examples where the different offset is indicated by DCI, additional bits are needed, e.g. additional N bits can be used, and (c) The NB can be shifted back to align with the NB defined in Rel-13 eMTC. In this regard, the FH scheme can follow pre-release eMTC FH scheme. After applying the FH, a new NB can be obtained. The new NB can be automatically shifted to the RBG boundary right before or after the NB, if the NB before hopping is shifted to the RBG boundary right before or after the NB, respectively. Alternatively, whether the hopped NB is shifted to align with the RBG boundary or not can be configured/signaled via DCI or RRC signaling.

In some aspects, wrap-around will be used for PDSCH if the NB after offsets is beyond the system BW. For PUSCH, either no shifting will be applied if the allocation with offsets is beyond the system BW resulting segments in resource allocation, or this PUSCH will be dropped.

In some aspects, there may be collision issues between other common control transmissions (e.g. SIBs) and the PDSCH transmission with flexible resource allocation. Also, for UL, there may be collision issues between PRACH and the PUSCH transmission with flexible resource allocation. In one aspect, it can be up to eNB scheduling to avoid the collision. Alternatively, once the PDSCH collides with other common control transmissions such as SIB transmissions, the PDSCH on the collided REs is punctured (i.e., the PDSCH is to still mapped to the collided REs but are not transmitted), or the whole PDSCH transmission during the collided subframe(s) is dropped. For UL, once PUSCH collides with PRACH transmission, the PUSCH on the collided REs is punctured (i.e., the PUSCH is still mapped to the collided REs but are not transmitted), or the PUSCH transmission on the collided subframe(s) is dropped.

In any of the aspects disclosed herein associated with MTC UEs, feMTC UEs, or efeMTC UEs, control channel communications may take place using MTC PDCCH (MPDCCH).

Additional Example Aspects

A system and method of supporting flexible resource allocation for PUSCH/PDSCH in efeMTC are disclosed herein. It is a UE capability to support flexible resource allocation. eNB can configure whether flexible resource allocation is supported via RRC signaling, depends on UE capability. The configuration of flexible resource allocation for PUSCH and for PDSCH can be joined or separate. The flexible resource allocation can be supported only when system BW is larger than 1.4 MHz. The flexible resource allocation can be supported only when a number of allocated PRBs is no less than X PRBs, e.g. X can be the RBG size. N bits can be used to indicate the offset from the resource allocation indicated based on pre-release indication method in units of PRBs, e.g. N can be 1 or 2 to indicate 2 or 4 offsets.

In some aspects, N bits can be used to indicate whether the allocated NB should be shifted to align with previous or next RBG boundary, e.g. N can be 1 or 2. In some aspects, more bits can be used to indicate the start of NB, which can be in terms of RBG index and/or NB index. In some aspects, the unused states for PDSCH/PUSCH with configured max PDSCH/PUSCH BW of 1.4 MHz in CE mode A can be used to indicate the RBG boundary aligned resource allocation. When the flexible resource allocation is supported for allocation with number of PRB>=X, the resource allocation states for a number of allocated PRBs>=X can be reinterpreted for flexible resource allocation.

In some aspects, the DCI size can be extended to include the additional bits needed for the flexible resource allocation. In some aspects, the FH flag bit can be used for flexible resource allocation indication if FH is not supported when flexible resource allocation is configured. In some aspects, the flexible resource allocation may not be supported for sub-PRB PUSCH. In some aspects, the flexible resource allocation may be supported for sub-PRB PUSCH.

In some aspects, frequency retuning can occur when the PDSCH/PUSCH switches from one NB to another NB, where the NB can be different from the NB definition in Rel-13 or Rel-14 eMTC. In cases where the NB index allocated for the DL/UL is the same, but one is shifted to align with RBG boundary while the other is the NB defined in pre-release without offsets, the UE can still perform RF retuning when it switches between these two NBs, if UE max PDSCH/PUSCH BW is 1.4 MHz.

In some aspects, FH is not supported when flexible resource allocation is configured or indicated. In some aspects, FH is supported when flexible resource allocation is configured. In some aspects, the hopped NB can be shifted with the same or different offsets to align with RBG boundary. In some aspects, wrap-around can be used for PDSCH when hopped PDSCH is beyond the system BW. In some aspects, the PUSCH can be dropped if the hopped NB is beyond system BW. In some aspects, the PDSCH/PUSCH is dropped on colliding SFs or punctured on colliding REs, when it collides with common control transmission (e.g. SIBs) or PRACH resources.

Figure 3:
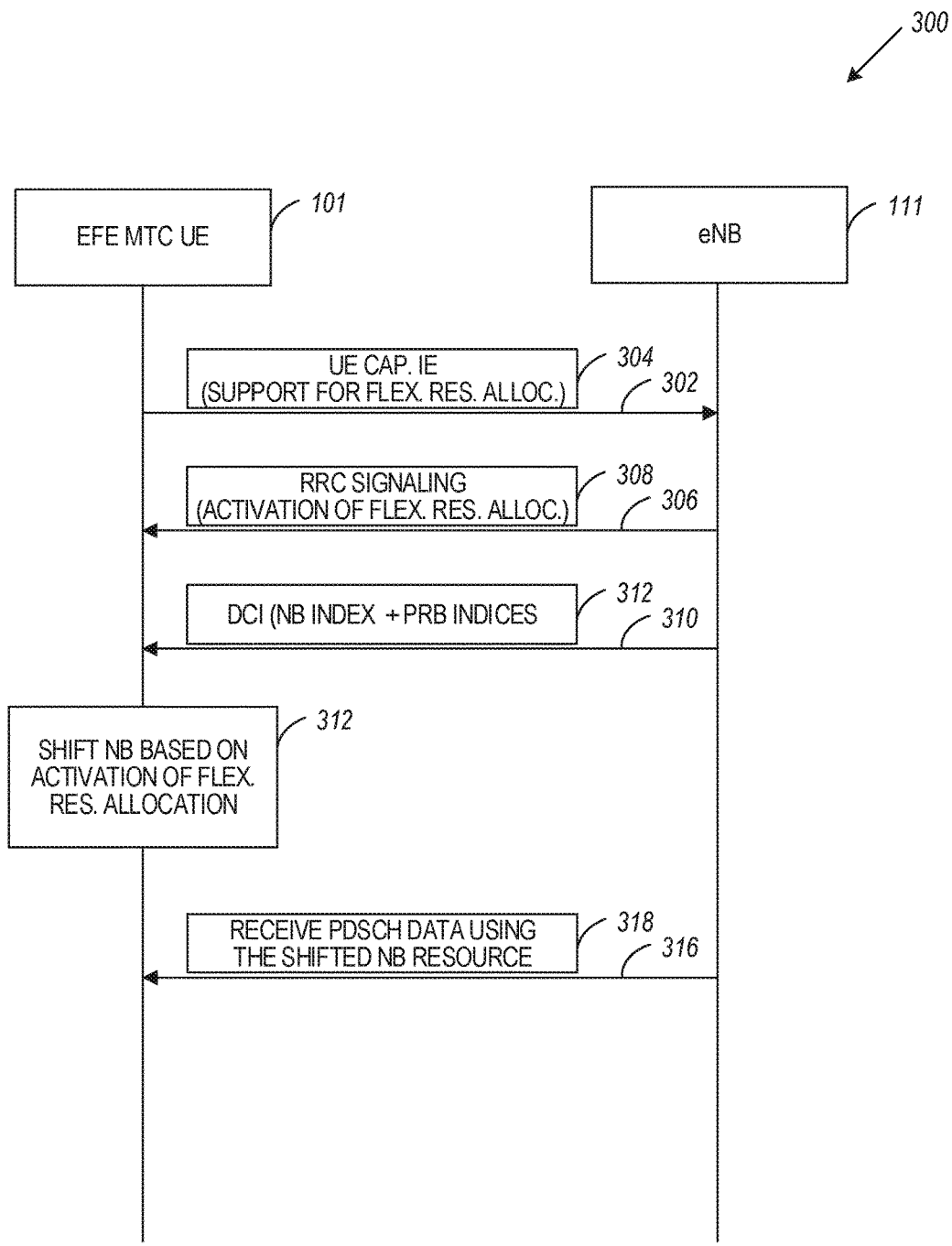
FIG. 3 illustrates an example communication flow between user equipment and an evolved Node-B (eNB) for flexible resource allocation, in some aspects.

FIG. 3 illustrates an example communication flow between user equipment and an evolved Node-B (eNB) for flexible resource allocation, in some aspects. Referring to FIG. 3, the example communication flow 300 can take place between the UE 101 (which can be an efeMTC UE) and eNB 111. At operation 302, UE 101 can communicate UE capability information element 3042 eNB 111, where the information element can indicate that the UE 101 supports flexible resource allocation. At operation 306, eNB 111 can communicate RRC signaling 308 indicating activation of flexible starting PRB for PDSCH resource allocation. At operation 310, eNB 111 can further communicate downlink control information 312 on PDCCH. The DCI 312 can indicate a narrowband (NB) index of a NB frequency resource and at least one PRB index for the PDSCH resource allocation. At operation 314, UE 101 can shift the NB frequency resource indicated by the NB index based on the activation of the flexible PRB for PDSCH resource allocation. At operation 316, UE 101 can decode PDSCH data 318 received from the eNB using the shifted NB frequency resource.

Figure 4:
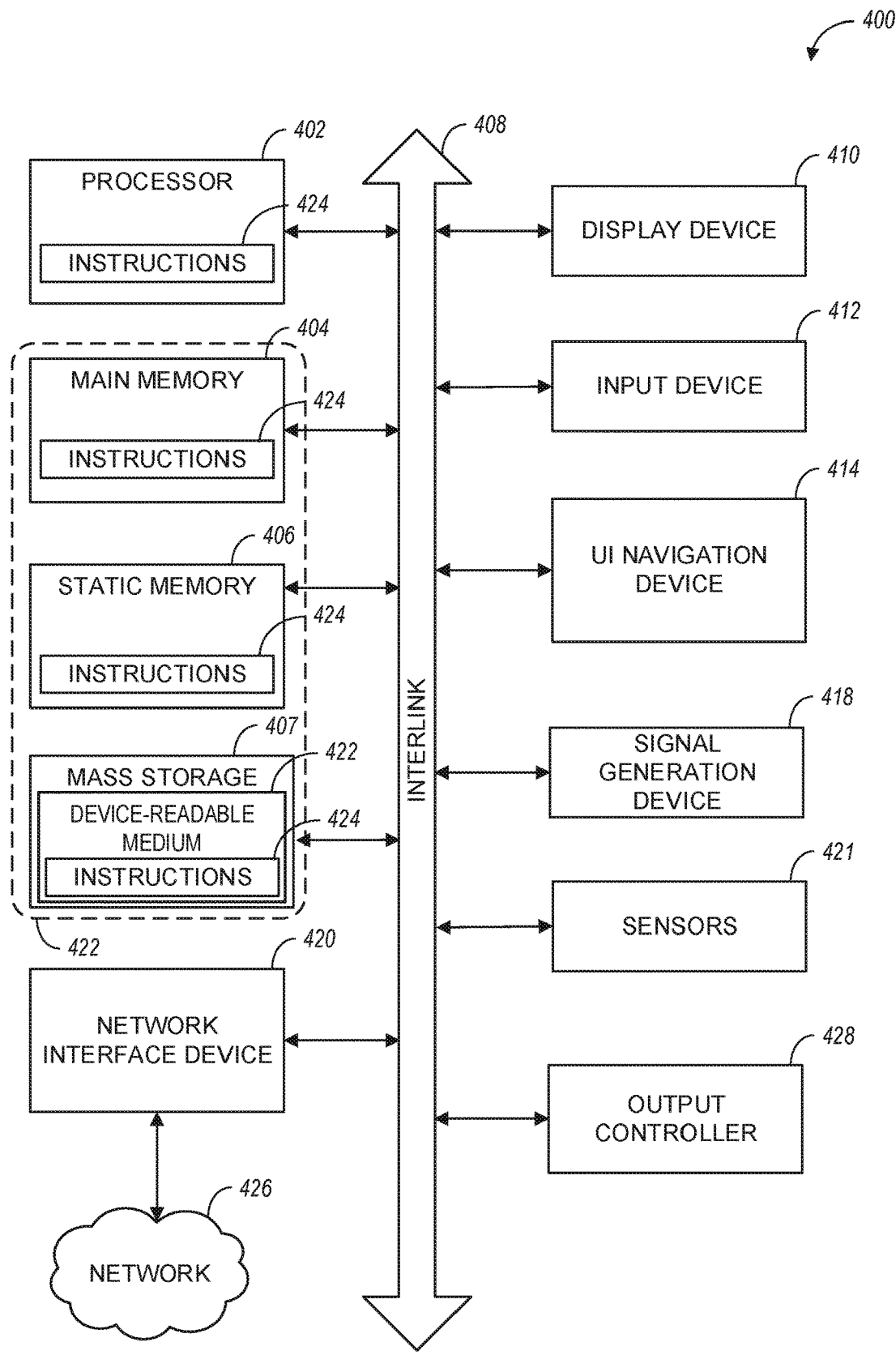
FIG. 4 illustrates a block diagram of a communication device such as an evolved Node-B (eNB), a new generation Node-B (gNB), an access point (AP), a wireless station (STA), a mobile station (MS), or a user equipment (UE) such as a drone, in accordance with some aspects.

FIG. 4 illustrates a block diagram of a communication device such as an evolved Node-B (eNB), a new generation Node-B (gNB), an access point (AP), a wireless station (STA), a mobile station (MS), or a user equipment (UE) such as a drone, in accordance with some aspects and to perform one or more of the techniques disclosed herein. In alternative aspects, communication device 400 may operate as a stand-alone device or may be connected (e.g., networked) to other communication devices.

Circuitry (e.g., processing circuitry) is a collection of circuits implemented intangible entities of the device 400 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 400 follow.

In some aspects, device 400 may operate as a standalone device or may be connected (e.g., networked) to other devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 400 may include a hardware processor 402 (e.g., a central processing unit (CPU), a graphics processing unit (GPU), a hardware processor core, or any combination thereof), a main memory 404, a static memory 406, and mass storage 407 (e.g., hard drive, tape drive, flash storage, or other block or storage devices), some or all of which may communicate with each other via an interlink (e.g., bus) 408.

The communication device 400 may further include a display device 410, an alphanumeric input device 412 (e.g., a keyboard), and a user interface (UI) navigation device 414 (e.g., a mouse). In an example, the display device 410, input device 412 and UI navigation device 414 may be a touch-screen display. The communication device 400 may additionally include a signal generation device 418 (e.g., a speaker), a network interface device 420, and one or more sensors 421, such as a global positioning system (GPS) sensor, compass, accelerometer, or another sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 407 may include a communication device-readable medium 422, on which is stored one or more sets of data structures or instructions 424 (e.g., software) embodying or utilized by any one or more of the techniques or functions described herein. In some aspects, registers of the processor 402, the main memory 404, the static memory 406, and/or the mass storage 407 may be, or include (completely or at least partially), the device-readable medium 422, on which is stored the one or more sets of data structures or instructions 424, embodying or utilized by any one or more of the techniques or functions described herein. In an example, one or any combination of the hardware processor 402, the main memory 404, the static memory 406, or the mass storage 416 may constitute the device-readable medium 422.

As used herein, the term "device-readable medium" is interchangeable with "computer-readable medium" or "machine-readable medium". While the communication device-readable medium 422 is illustrated as a single medium, the term "communication device-readable medium" may include a single medium or multiple media (e.g., a centralized or distributed database, and/or associated caches and servers) configured to store the one or more instructions 424.

The term "communication device-readable medium" is inclusive of the terms "machine-readable medium" or "computer-readable medium", and may include any medium that is capable of storing, encoding, or carrying instructions (e.g., instructions 424) for execution by the communication device 400 and that cause the communication device 400 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 424 may further be transmitted or received over a communications network 426 using a transmission medium via the network interface device 420 utilizing any one of a number of transfer protocols. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input-multiple-output (SIMO), MIMO, or multiple-input-single-output (MISO) techniques. In some examples, the network interface device 420 may wirelessly communicate using Multiple User MIMO techniques.

The term "transmission medium" shall be taken to include any intangible medium that is capable of storing, encoding or carrying instructions for execution by the communication device 400, and includes digital or analog communications signals or another intangible medium to facilitate communication of such software. In this regard, a transmission medium in the context of this disclosure is a device-readable medium.

A communication device-readable medium may be provided by a storage device or other apparatus which is capable of hosting data in a non-transitory format. In an example, information stored or otherwise provided on a communication device-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the communication device-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus of a user equipment (UE), the apparatus comprising:
    processing circuitry, wherein to configure the UE for machine type communication (MTC) within an LTE network, the processing circuitry is to:
        decode UE-specific radio resource control (RRC) signaling from a base station, the UE-specific RRC signaling including an indicator of activation of flexible starting physical resource block (PRB) for MTC physical downlink shared channel (MPDSCH) resource allocation;
        decode downlink control information (DCI) received in an MTC physical downlink control channel (MPDCCH), the DCI indicating a narrowband (NB) index of a NB frequency resource and at least one PRB index for the MPDSCH resource allocation;
        shift the NB frequency resource indicated by the NB index based on the activation of the flexible starting PRB for the MPDSCH resource allocation in the UE-specific RRC signaling; and
        decode PDSCH data received from the base station using the shifted NB frequency resource; and
    memory coupled to the processing circuitry, the memory configured to store the DCI.

2. The apparatus of claim 1, wherein the at least one PRB index is a plurality of PRB indices identifying PRBs within the NB frequency resource.

3. The apparatus of claim 1, wherein the NB frequency resource is shifted so that a boundary of the NB frequency resource aligns with a previous or a next resource block group (RBG) boundary.

4. The apparatus of claim 1, wherein the UE-specific RRC signaling further indicates that frequency hopping (FH) is enabled for the UE together with the flexible PRB for the MPDSCH resource allocation.

5. The apparatus of claim 1, wherein an amount of the shift of the NB frequency resource is based on one or both of a system bandwidth used by the UE within the LTE, network and the NB index, and wherein the flexible starting PRB for the MPDSCH resource allocation is not supported by the UE when the system bandwidth is 1.4 MHz.

6. The apparatus of claim 1, wherein the processing circuitry is to:
    encode a UE capability information element indicating the UE supports the flexible PRB for the MPDSCH resource allocation.

7. The apparatus of claim 1, wherein the processing circuitry is to:
    decode higher layer signaling configuring the UE to support the flexible PRB for the MPDSCH resource allocation, wherein the higher layer signaling is a system information block (SIB) or a dedicated RRC signaling.

8. The apparatus of claim 1, wherein the DCI includes a resource allocation bit field with a plurality of bits, wherein a first portion of the plurality of bits indicates the NB index, and wherein a remaining second portion of the plurality of bits indicates a resource block group (RBG) boundary for shifting the NB frequency resource.

9. The apparatus of claim 1, wherein the processing circuitry is to:
    perform frequency re-tuning to a center frequency of a tuning narrowband, the tuning narrowband starting at a boundary of the shifted NB resource and including six resource blocks (RBs).

10. The apparatus of claim 1, further comprising transceiver circuitry coupled to the processing circuitry; and, one or more antennas coupled to the transceiver circuitry.

11. An apparatus of a base station, the apparatus comprising:
processing circuitry, wherein to configure a User Equipment (UE) for machine type communication (MTC), the processing circuitry is to:
encode UE-specific radio resource control (RRC) signaling for transmission to the UE, the UE-specific RRC signaling including an indicator of activation of flexible starting physical resource block (PRB) for MTC physical downlink shared channel (MPDSCH) resource allocation;
encode downlink control information (DCI) for transmission in an MTC physical downlink control channel (MPDCCH), the DCI indicating a narrowband (NB) index of a NB frequency resource and at least one PRB index for the MPDSCH resource allocation; and
encode PDSCH data for transmission to the UE using a shifted frequency resource, wherein the shifted frequency resource is determined by shifting the NB frequency resource indicated by the NB index based on the activation of the flexible starting PRB for the MPDSCH resource allocation in the UE-specific RRC signaling; and
memory coupled to the processing circuitry, the memory configured to store the PDSCH data.

12. The apparatus of claim 11, wherein the processing circuitry is to:
encode higher layer signaling configuring the UE to support the flexible PRB for the MPDSCH resource allocation, wherein the higher layer signaling is a system information block (SIB) or a dedicated RRC signaling.

13. The apparatus of claim 11, wherein the DCI includes a resource allocation bit field with a plurality of bits, wherein a first portion of the plurality of bits indicates the NB index, and wherein a remaining second portion of the plurality of bits indicates a resource block group (RBG) boundary for shifting the NB frequency resource.

14. The apparatus of claim 11, wherein the NB frequency resource is shifted so that a boundary of the NB frequency resource aligns with a previous or a next resource block group (RBG) boundary.

15. The apparatus of claim 11, wherein the UE-specific RRC signaling further indicates that frequency hopping (FH) is enabled for the UE together with the flexible PRB for the MPDSCH resource allocation.

16. The apparatus of claim 11, wherein unused states in the DCI are used for the indicating of the activation of the flexible starting PRB for the MPDSCH resource allocation.

17. A non-transitory computer-readable storage medium that stores instructions for execution by one or more processors of a user equipment (UE) configured for machine type communication (MTC) in an LTE network, the instructions to configure the one or more processors to cause the UE to:
decode UE-specific radio resource control (RRC) signaling from a base station, the UE-specific RRC signaling including an indicator of activation of flexible starting physical resource block (PRB) for MTC physical downlink shared channel (MPDSCH) resource allocation;
decode downlink control information (DCI) received in an MTC physical downlink control channel (MPDCCH), the DCI indicating a narrowband (NB) index of a NB frequency resource and at least one PRB index for the MPDSCH resource allocation;
shift the NB frequency resource indicated by the NB index based on the activation of the flexible starting PRB for the MPDSCH resource allocation in the UE-specific RRC signaling; and
decode PDSCH data received from the base station using the shifted NB frequency resource.

18. The non-transitory computer-readable storage medium of claim 17, wherein the NB frequency resource is shifted so that a boundary of the NB frequency resource aligns with a previous or a next resource block group (RBG) boundary.

19. The non-transitory computer-readable storage medium of claim 17, wherein the UE-specific RRC signaling further indicates that frequency hopping (FH) is enabled for the UE together with the flexible PRB for the MPDSCH resource allocation.

20. The non-transitory computer-readable storage medium of claim 17, wherein the instructions further configure the one or more processors to cause the UE to:
perform frequency re-tuning to a center frequency of a tuning narrowband, the tuning narrowband starting at a boundary of the shifted NB resource and including six resource blocks (RBs).

* * * * *

UNITED STATES PATENT AND TRADEMARK OFFICE
CERTIFICATE OF CORRECTION

PATENT NO. : 10,880,950 B2  Page 1 of 1
APPLICATION NO. : 16/277556
DATED : December 29, 2020
INVENTOR(S) : Ye et al.

It is certified that error appears in the above-identified patent and that said Letters Patent is hereby corrected as shown below:

On the Title Page

In item (54), in "Title", in Column 1, Line 1, before "FLEXIBLE", insert --DESIGN OF--

In the Specification

In Column 1, Line 1, before "FLEXIBLE", insert --DESIGN OF--

In the Claims

In Column 22, Line 15, in Claim 1, delete "DO" and insert --DCI-- therefor

In Column 22, Line 40, in Claim 5, delete "LTE," and insert --LTE-- therefor

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*